United States Patent Office 3,069,478
Patented Dec. 18, 1962

3,069,478
ARALKYLATION OF AROMATICS
WITH STYRENES
Robert L. McLaughlin, Woodbury, N.J., assignor to Socony Mobil Oil Company, Inc., a corporation of New York
No Drawing. Filed Mar. 1, 1960, Ser. No. 11,960
12 Claims. (Cl. 260—649)

This invention relates to the production of substituted aromatic hydrocarbon derivatives. It is more particularly concerned with a catalytic process for reacting styrene and substituted styrenes with aromatic hydrocarbons.

As is well known to those skilled in the art a reaction between an olefinic hydrocarbon and an aromatic hydrocarbon, wherein a hydrogen of the aromatic ring is replaced by an alkyl group, is a form of alkylation reaction. When the olefin has an aromatic substitutent, as in the case of styrene, the reaction with an aromatic hydrocarbon is called an "aralkylation" reaction. The term is used in this sense in the specification and claims. In the case of styrene itself the reaction is referred to as "styrenation" herein. It has been proposed to aralkylate or to styrenate aromatic hydrocarbons in the presence of strong sulfuric acid catalyst. Such processes have been disadvantageous, because they require time-consuming, laborious process steps to remove the sulfuric acid and its degradation products. Further the sulfuric acid catalyzes polymerization of the aromatic olefin (e.g. styrene), thereby causing unreasonable loss in the process.

It has now been found that aromatic hydrocarbons can be aralkylated readily with good yield. It has been discovered that aromatic hydrocarbons can be aralykylated with styrene and its derivatives in the presence of certain solid catalysts that can be removed by simple filtration.

Accordingly, it is an object of this invention to provide a process for aralkylating aromatic hydrocarbons. Another object is to provide a catalytic process for aralkylating aromatic hydrocarbons. A specific object is to provide a catalytic process for aralkylating aromatic hydrocarbons in the presence of a solid catalyst. Another specific object is to provide a catalytic process for styrenating alkylbenzenes. Other objects and advantages of this invention will become apparent to those skilled in the art, from the following detailed description.

In general, this invention provides a process for aralkylating aromatic hydrocarbons that comprises reacting a styrene reactant with an alkyl aromatic hydrocarbon, in the presence of a catalyst selected from the group consisting of acid-treated clay of the montmorillonite type and synthetic silica-alumina containing between about 7 percent and about 15 percent alumina by weight, at a temperature varying between about 60° C. and about 150° C.; the molar ratio of said alkyl aromatic hydrocarbon to said styrene reactant being at least about 1:1 and the amount of catalyst being between about one percent and about 5 percent of the weight of the total reactants.

The styrene reactants contemplated herein are styrene and its ring-substituted derivatives. The ring substituents can be lower alkyl, halogen, i.e. substituents other than those which normally hinder alkylation reactions, such as amino groups which poison or react with the catalyst. Non-limiting examples of the styrene reactants are styrene, vinyltoluene (p-methylstyrene), and dichlorostyrene.

The alkyl aromatic hydrocarbons utilizable herein are generally the alkylbenzenes, although alkyl naphthalenes can be used. The alkyl aromatic hydrocarbons can have up to three alkyl groups. The substituent alkyl groups can be straight chain or branched chain and can have up to 18 carbon atoms per alkyl groups. However, the lower alkyl groups, i.e. butyl and lower, are preferred. Non-limiting examples of the aromatic hydrocarbon reactant are toluene, cumene, cymene, xylene, trimethylnaphthalene, ethylbenzene, methylnaphthalene, diethylbenzene, and butylbenzene.

The catalysts utilizable herein are acid activated montmorillonite type clay and synthetic composites of silica and alumina. In the runs described hereinafter a non-swelling bentonite clay of the montmorillonite type, which has been activated by acid treatment to give a composition:

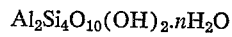

$$Al_2Si_4O_{10}(OH)_2 \cdot nH_2O$$

was used. This product is available in the activated state under the trade name "Super Filtrol." The acid activation treatment is well known to those skilled in the art and is described more or less in detail by B. A. Stagner in "The Science of Petroleum," volume III, page 1699 (Oxford Press) (1938). For the activation of small quantities of clay a similar treatment may be used. Thus, one kilogram of bentonite is boiled with 2,000 cubic centimeters of 17 percent sulfuric acid for three hours. The mixture is filtered and the clay washed with distilled water until the filtrate is substantially free from acid (0.2 to 0.5 percent acid). The clay is then dried to a moisture content of about 15 percent and ground to pass a 200-mesh screen. When the acid treated clay is washed with "hard" water after the acid is neutralized, the clay is injured by absorbing basic ions from the water.

When only a portion of the total extractable material is leached from the clay by the acid, the maximum activity is developed. The optimum concentration of the acid is about 15 percent to about 20 percent. Sulfuric and hydrochloric acid are the most economical to use although sulfuric acid is somewhat slower than hydrochloric.

The other type of material found effective as a catalyst herein are synthetic composites of silica and alumina which are acidic in nature. Such composites will contain about 7 percent and about 15 percent, by weight, of alumina, the balance being substantially silica. There appears to be nothing critical about the manner in which these composites are prepared. They may be made by any of the usual methods well known to those skilled in the manufacture of catalysts. A feasible method for preparing the catalyst involves adding an aqueous acidic solution, containing the required amount of aluminum salt, to an aqueous solution of sodium silicate, thus precipitating the silica and alumina simultaneously. This type of operation can be carried out in accordance with the method known in United States Patent No. 2,384,946 to produce the catalyst in a hydrogel bead form.

Another modified form of the synthetic silica-alumina composite is one having incorporated into the silica-alumina sol a small amount of powdered material insoluble in the sol. Such catalysts are described in United States Letters Patent No. 2,900,349.

The basic, and preferred, aralkylation involved herein is the 1:1 molar addition reaction. As illustrated with styrene and xylene, the desired product is xylylphenylethane (i.e. a monostyrenated product). This material and the related 1:1 products from using other styrenes or aromatic hydrocarbons are good secondary plasticizers for polyvinyl resins, such as polyvinyl chloride. The distyrenated product is, to some extent, also useful as a polyvinyl resin plasticizer, usually when used together with the monostyrenated product. Higher alkylation products are not deemed desirable. Accordingly, the process of this invention is controlled to produce a major amount of monostyrenated product, a smaller amount of distyrenated product, and a minimum amount of higher alkylated, or "polymer," products.

Therefore, the efficiency of the process is measured upon the basis of the amount of aromatic hydrocarbon theoretically required to produce 100% monostyrenated product in relation to the amount of aromatic hydrocarbon actually reacted. As all the styrene reactant is consumed in the process, the greater the amount of polystyrenated material and polymer there is formed the less will be the amount of aromatic hydrocarbon reacted. Thus, when the bulk of the product is polystyrenated matter and polymer (as in Example 1, infra), the amount of aromatic hydrocarbon (xylene, in Example 1) consumed will be small and the efficiency (amount aromatic hydrocarbon reacted ×100 divided by theoretical amount aromatic hydrocarbon for 100% 1:1 product) will be low (23%, in Example 1). Complete, 100 percent efficiency, of course, is attained when all the product is 1:1 addition product.

REACTING STYRENE WITH XYLENE— TEMPERATURE EFFECT

*Examples 1 Through 8*

A series of runs was made in which styrene and xylene were reacted in the presence of acid-treated clay of the montmorillonite type (Super Filtrol) as the catalyst. In each run, a different combination of reactant ratio, catalyst ratio, and temperature was used. The pertinent data thereon are set forth in Table I.

In each run, the xylene and clay catalyst were charged to a reaction vessel and agitated. The xylene-clay mixture was heated to the reaction temperature indicated for the run and styrene was added portionwise over a period of about 2 hours. As the reaction was exothermic, the rate of addition was adjusted so that little or no external heating or cooling was needed. After the styrene was all added, the reaction mixture was maintained at the selected temperature for an additional one-half to one hour to insure complete reaction of the styrene. The mixture was cooled and filtered to remove the catalyst. The filtrate was topped to remove unreacted xylene and then vacuum-distilled. Fraction 1 was xylylphenylethane boiling at 380° C. at 760 mm. mercury pressure and fraction 2 was distyrenated xylene (dimethylbenzylxylene) boiling at 450° C. at 760 mm. mercury pressure. The residue was a mixture of higher styrenated and polymeric material. Pertinent results are set forth in Table I.

TABLE I

| Example | Reactants, grams | | | Weight Percent | Temp., °C. | Products, grams | | | Xylene reacted, g. | Efficiency, Percent |
|---|---|---|---|---|---|---|---|---|---|---|
| | Styrene | Xylene | Catalyst | | | Fraction 1 | Fraction 2 | Residue | | |
| 1 | 208 | 500 | 10 | 1.4 | 60 | 47 | 38 | 171 | 48 | 23 |
| 2 | 208 | 500 | 10 | 1.4 | 80 | 165 | 77 | 62 | 104 | 51 |
| 3 | 208 | 500 | 10 | 1.4 | 125 | 252 | 48 | 37 | 129 | 61 |
| 4 | 208 | 500 | 10 | 1.4 | 135 | 263 | 73 | 12 | 140 | 66 |
| 5 | 208 | 500 | 10 | 1.4 | 125-150 | 271 | 58 | 21 | 141 | 67 |
| 6 | 208 | 500 | 10 | 1.4 | 150 | 240 | 59 | 16 | 107 | 50 |
| 7 | 208 | 1,000 | 25 | 2.1 | 135 | 328 | 44 | 10 | 174 | 82 |
| 8 | 208 | 1,000 | 25 | 2.1 | 150 | 300 | 45 | 18 | 158 | 75 |

From the data in Table I, it will be noted that the process of this invention is operable at temperatures as low as about 60° C. and as high as about 150° C. Preferably, the reaction is carried out at temperatures varying between about 135° C. and about 150° C. The run of Example 7 was made under the optimum conditions found to obtain maximum yield of desired product.

EFFECT OF CATALYST CONCENTRATION

*Examples 9 and 10*

A series of runs were made reacting xylene and styrene in the presence of acid-treated montmorillonite type clay catalyst. These runs were made using the procedure described for the runs of Examples 1 through 8. The variant in these runs was catalyst concentration. Pertinent data and results are set forth in Table II. For comparison, the data for the run of Example 6 are also tabulated.

TABLE II

| Example | Reactants, grams | | | Weight Percent | Temp., °C. | Products, grams | | | Xylene reacted, g. | Efficiency, Percent |
|---|---|---|---|---|---|---|---|---|---|---|
| | Styrene | Xylene | Catalyst | | | Fraction 1 | Fraction 2 | Residue | | |
| 9 | 208 | 500 | 5 | 0.7 | 150 | 183 | 56 | 30 | 53 | 25 |
| 6 | 208 | 500 | 10 | 1.4 | 150 | 240 | 59 | 16 | 107 | 50 |
| 10 | 208 | 500 | 25 | 3.5 | 150 | 252 | 63 | 23 | 130 | 61 |

It will be noted that concentrations of catalyst, based upon total charge, as low as 0.7 weight percent are effective. Higher catalyst concentrations are, however, more effective. Generally, the reaction can be carried out using catalyst weight concentrations varying between about 0.7 percent and about 5 percent, and preferably between about 2 percent and about 3 percent for maximum yields.

EFFECT OF SOLVENT CONCENTRATION

*Examples 11 and 12*

Runs were made reacting styrene and xylene in the presence of acid-treated montmorillonite type clay catalyst, using the procedure described for the runs of Examples 1 through 8. The variant in these runs was the amount of xylene to show the effect of the presence of xylene in excess of the stoichiometric amount. Pertinent data are set forth in Table III together with data from the run of Example 6, for comparison purposes.

TABLE III

| Example | Reactants, grams | | | | Weight percent | Temp., °C. | Products, grams | | | Xylene reacted, g. | Efficiency, percent |
|---|---|---|---|---|---|---|---|---|---|---|---|
| | Styrene | Xylene | Moles excess | Catalyst | | | Fraction 1 | Fraction 2 | Residue | | |
| 11 | 208 | 212 | None | 10 | 2.4 | 150 | 176 | 82 | 18 | 68 | 32 |
| 6 | 208 | 500 | 2.7 | 10 | 1.4 | 150 | 240 | 59 | 16 | 107 | 50 |
| 12 | 208 | 1,000 | 7.4 | 10 | 0.9 | 150 | 274 | 49 | 10 | 125 | 59 |

From the data of Table III, it is noted that when stoichiometric amounts of reactants are used (Example 11) with no excess xylene diluent, the efficiency of the reaction is relatively low. As more diluent, excess xylene is used efficiency increases. In general, the reaction is effective with no diluent. However, it is preferred to use between about 2 moles and about 8 moles excess aromatic hydrocarbon reactant (xylene).

The time of reaction has little effect upon the efficiency of the reaction. The primary factor involved is the rate (and, thus, the time) of addition of the styrene reactant. Too rapid addition will lower the efficiency, because of greater polymerization and faster reduction of dilution. In general, the reaction can be carried out in between about one hour and about 5 hours.

and yields are not generally so great as with styrene. The general and optimum conditions, however, are of the same magnitude as with styrene.

Examples 17 Through 22

These examples show the effect of temperature variations. Runs were made reacting vinyltoluene (p-methylstyrene) and xylene at various temperatures in the presence of acid-activated montmorillonite type clay catalyst, using the general procedures of Examples 1 through 9. In these runs, fraction 1 (mono-methylstyrenated product) boiled at 355° C. under 760 millimeters mercury pressure, and fraction 2 (di-methylstyrenated product) boiled at 435° C. under 760 millimeters mercury pressure. Pertinent data and results are set forth in Table V.

TABLE V

| Example | Reactants, grams | | | Weight percent | Temp., °C. | Products, grams | | | Xylene reacted, g. | Efficiency, percent |
|---|---|---|---|---|---|---|---|---|---|---|
| | Vinyl-toluene | Xylene | Catalyst | | | Fraction 1 | Fraction 2 | Residue | | |
| 17 | 236 | 1,000 | 25 | 2.0 | 80 | 87 | 99 | 98 | 48 | 23 |
| 18 | 236 | 1,000 | 25 | 2.0 | 100 | 193 | 94 | 34 | 85 | 40 |
| 19 | 236 | 1,000 | 25 | 2.0 | 120 | 258 | 67 | 15 | 104 | 49 |
| 20 | 177 | 750 | 20 | 2.2 | 135 | 205 | 34 | 28 | 90 | 57 |
| 21 | 236 | 1,000 | 25 | 2.0 | 140 | 309 | 41 | 21 | 135 | 64 |
| 22 | 177 | 750 | 20 | 2.2 | 150 | 201 | 44 | 15 | 83 | 52 |

AROMATICS OTHER THAN XYLENE

Examples 13 Through 16

Runs were made reacting aromatic hydrocarbon reactants other than xylene with styrene in the presence of acid-treated montmorillonite type clay. The procedure used was like that of Examples 1 through 9. Pertinent data, reactants, and results are set forth in Table IV.

Examples 23 and 24

These runs show the effect of catalyst concentration. Runs were made reacting vinyltoluene (p-methylstyrene) and xylene in the presence of the acid-treated montmorillonite type clay catalyst, using the procedure of Examples 17 through 22. The variant was catalyst concentration. Pertinent data and results, in comparison with those of Example 21, are set forth in Table VI.

TABLE IV

| Example | Aromatic | Reactants, grams | | | Weight percent | Temp., °C. | Products, grams | | | Aromatic reacted, g. | Efficiency, percent |
|---|---|---|---|---|---|---|---|---|---|---|---|
| | | Styrene | Aromatic | Catalyst | | | Fraction 1 | Fraction 2 | Residue | | |
| 13 | Cumene | 208 | 500 | 10 | 1.4 | 160 | 176 | 55 | 28 | 51 | 22 |
| 14 | m/p-Cymene | 156 | 394 | 15 | 2.7 | 140 | 165 | 19 | 51 | 28 | 14 |
| 15 | Toluene | 200 | 500 | 5 | 0.7 | 110 | 123 | 48 | 53 | 24 | 13 |
| 16 | Diethylbenzene | 35 | 115 | 3.5 | 2.3 | 135 | 42 | 3 | 13 | 13 | 29 |

The data of Table IV show that the reaction is effective

TABLE VI

| Example | Reactants, grams | | | Weight percent | Temp., °C. | Products, grams | | | Xylene reacted, g. | Efficiency, percent |
|---|---|---|---|---|---|---|---|---|---|---|
| | Vinyl-toluene | Xylene | Catalyst | | | Fraction 1 | Fraction 2 | Residue | | |
| 23 | 236 | 1,000 | 10 | 0.8 | 140 | 287 | 53 | 7 | 104 | 49 |
| 21 | 236 | 1,000 | 25 | 2.0 | 140 | 309 | 41 | 21 | 135 | 64 |
| 24 | 236 | 1,000 | 50 | 4.0 | 140 | 255 | 71 | 7 | 90 | 42 | with various alkylaromatic hydrocarbons. Benzene, however, does not appear to be utilizable in the process of this invention.

USE OF VINYLTOLUENE

Other substituted styrene reactants can be used. However, the substituted styrenes generally tend to polymerize more readily than styrene. Accordingly, efficiencies

Examples 25 and 26

These examples show the effect of solvent concentration. Runs were made reacting vinyltoluene (methylstyrene) and xylene in the presence of the acid-treated montmorillonite type clay catalyst, using the procedure of Examples 17 through 21. Pertinent data and results, in comparison with those of example 21, are set forth in Table VII.

TABLE VII

| Example | Vinyl-toluene | Xylene | Moles Excess | Catalyst | Weight Percent | Temp., °C. | Fraction 1 | Fraction 2 | Residue | Xylene reacted, g. | Efficiency, Percent |
|---|---|---|---|---|---|---|---|---|---|---|---|
| 25 | 236 | 500 | 2.7 | 25 | 3.4 | 140 | 238 | 66 | 20 | 88 | 42 |
| 21 | 236 | 1,000 | 7.4 | 25 | 2.0 | 140 | 309 | 41 | 21 | 135 | 64 |
| 26 | 236 | 1,500 | 12.2 | 25 | 1.4 | 140 | 320 | 49 | 10 | 143 | 68 |

USE OF DICHLOROSTYRENE AND OF OTHER CATALYSTS

Example 27

A run was made reacting dichlorostyrene and xylene in the presence of acid-treated montmorillonite type clay catalyst, using the procedure of Examples 1 through 9. The fraction 1 (mono-dichlorostyrenated product) boiled at 380° C. under 760 millimeters mercury pressure. Pertinent data and results are set forth in Table VIII.

Examples 28 and 29

As described in Examples 1 through 9, runs were made wherein the catalyst was a synthetic silica-alumina containing about 10 weight percent alumina (catalyst of Example 10 of United States Patent No. 2,900,349). Pertinent data and results are set forth in Table VIII.

TABLE VIII

| Example | Styrene | Xylene | Catalyst | Weight Percent | Temp., °C. | Fraction 1 | Fraction 2 | Residue | Xylene reacted | Efficiency, Percent |
|---|---|---|---|---|---|---|---|---|---|---|
| 27 | ¹ 98 | 500 | ² 20 | 3.3 | 140 | 138 |  | 6 | 46 | 77 |
| 28 | 208 | 500 | ³ 10 | 1.4 | 135 | 195 | 65 | 32 | 84 | 40 |
| 29 | 208 | 1,000 | ³ 25 | 2.1 | 135 | 279 | 19 | 43 | 133 | 63 |

¹ Dichlorostyrene.  ² Clay.  ³ Silica-alumina.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for aralkylating aromatic hydrocarbons that comprises reacting a styrene reactant with an alkyl aromatic hydrocarbon, in the presence of a catalyst selected from the group consisting of an acid-treated clay of the montmorillonite type and synthetic silica-alumina containing between about 7 percent and about 15 percent alumina by weight, at a temperature varying between about 60° C. and about 150° C.; the molar ratio of said alkyl aromatic hydrocarbon to said styrene reactant being at least about 1:1 and the amount of said catalyst being between about 0.7 percent and about 5 percent of the weight of total reactants.

2. The process defined in claim 1, wherein said alkyl aromatic hydrocarbon reactant is a lower-alkyl benzene.

3. A process for aralkylating aromatic hydrocarbons that comprises reacting styrene with a lower-alkyl benzene, in the presence of an acid-treated clay of the montmorillonite type, at a temperature varying between about 135° C. and about 150° C.; the molar ratio of said lower-alkyl benzene to said styrene being between about 3:1 and about 9:1 and the amount of said acid-treated clay being between about 0.7 percent and about 5 percent of the weight of the total reactants.

4. The process defined in claim 3, wherein said lower-alkyl benzene is xylene.

5. The process defined in claim 3, wherein said lower-alkyl benzene is cumene.

6. The process defined in claim 3, wherein said lower-alkyl benzene is cymene.

7. The process defined in claim 3, wherein said lower-alkyl benzene is toluene.

8. The process defined in claim 3, wherein said lower-alkyl benzene is diethylbenzene.

9. A process for aralkylating aromatic hydrocarbons that comprises reacting vinyltoluene with xylene, in the presence of an acid-activated clay of the montmorillonite type, at a temperature varying between about 135° C. and about 150° C.; the molar ratio of said xylene to said vinyltoluene being between about 3:1 and about 9:1 and the amount of said acid-treated clay being between about 0.7 percent and about 5 percent of the weight of the total reactants.

10. A process for aralkylating aromatic hydrocarbons that comprises reacting dichlorostyrene with xylene, in the presence of an acid-treated clay of the montmorillonite type, at a temperature varying between about 135° C. and about 150° C.; the molar ratio of said xylene to said dichlorostyrene being between about 3:1 and 9:1 and the amount of said acid-treated clay being between about 0.7 percent and about 5 percent of the weight of the total reactants.

11. A process for aralkylating aromatic hydrocarbons that comprises reacting styrene with a lower-alkyl benzene, in the presence of a synthetic silica-alumina containing between about 7 percent and about 15 percent alumina by weight, at a temperature varying between about 135° C. and about 150° C.; the molar ratio of said lower-alkyl benzene to said styrene being between about 3:1 and about 9:1 and the amount of said silica-alumina being between about 0.7 percent and about 5 percent of the weight of the total reactants.

12. The process defined in claim 11, wherein said lower-alkyl benzene is xylene.

References Cited in the file of this patent

UNITED STATES PATENTS

| | | |
|---|---|---|
| 2,564,488 | Mahan | Aug. 14, 1951 |
| 2,767,230 | Brown et al. | Oct. 16, 1956 |
| 2,930,820 | Aries | Mar. 29, 1960 |

FOREIGN PATENTS

| | | |
|---|---|---|
| 585,073 | Great Britain | Jan. 29, 1947 |